(12) United States Patent
Hicks, III et al.

(10) Patent No.: US 10,303,858 B2
(45) Date of Patent: May 28, 2019

(54) LIFE CYCLE MANAGEMENT OF USER-SELECTED APPLICATIONS ON WIRELESS COMMUNICATIONS DEVICES

(71) Applicant: AT&T Intellectual Property I, L.P., Atlanta, GA (US)

(72) Inventors: John Alson Hicks, III, Roswell, GA (US); Douglas R. O'Neil, Yorba Linda, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 366 days.

(21) Appl. No.: 14/837,998

(22) Filed: Aug. 27, 2015

(65) Prior Publication Data
US 2015/0363579 A1 Dec. 17, 2015

Related U.S. Application Data

(63) Continuation of application No. 13/307,713, filed on Nov. 30, 2011, now Pat. No. 9,124,691, which is a continuation of application No. 11/555,536, filed on Nov. 1, 2006, now Pat. No. 8,126,128.

(51) Int. Cl.
| | |
|---|---|
| *G06F 8/61* | (2018.01) |
| *H04M 3/42* | (2006.01) |
| *G06F 21/10* | (2013.01) |
| *G06Q 30/02* | (2012.01) |
| *H04M 1/725* | (2006.01) |
| *H04M 3/487* | (2006.01) |

(52) U.S. Cl.
CPC .............. *G06F 21/105* (2013.01); *G06F 8/61* (2013.01); *G06Q 30/02* (2013.01); *H04M 1/72525* (2013.01); *H04M 3/42178* (2013.01); *H04M 1/72583* (2013.01); *H04M 3/4878* (2013.01)

(58) Field of Classification Search
CPC ......... G06F 21/105; G06F 8/61; G06Q 30/02; H04M 1/72525; H04M 3/42178; H04M 1/72583; H04M 3/4878
See application file for complete search history.

(56) References Cited

U.S. PATENT DOCUMENTS

| | | | | |
|---|---|---|---|---|
| 5,881,236 | A | * | 3/1999 | Dickey ............... G06F 8/61 709/220 |
| 5,950,138 | A | * | 9/1999 | Norimatsu ............ H04W 8/183 455/551 |
| 6,094,573 | A | * | 7/2000 | Heinonen ............. H04M 3/382 379/88.25 |

(Continued)

OTHER PUBLICATIONS

U.S. Office Action dated Sep. 15, 2010 in U.S. Appl. No. 11/555,536.

(Continued)

*Primary Examiner* — Sharon S Lynch
(74) *Attorney, Agent, or Firm* — Hartman & Citrin LLC

(57) ABSTRACT

Tools and techniques for performing life cycle management of user-selected applications on wireless communications devices are described herein. In part, the tools provide machine-readable media for presenting to the subscriber a list of available applications for installation on the device, and for receiving selections from the subscriber of one or more of the applications. Additionally, the tools provide methods for selling advertising space on the devices.

17 Claims, 7 Drawing Sheets

(56) References Cited

U.S. PATENT DOCUMENTS

| | | | | |
|---|---|---|---|---|
| 6,105,063 A * | 8/2000 | Hayes, Jr. | H04L 29/06 | 709/223 |
| 6,105,066 A * | 8/2000 | Hayes, Jr. | H04L 29/06 | 709/220 |
| 6,108,712 A * | 8/2000 | Hayes, Jr. | G06F 9/44505 | 709/212 |
| 6,131,116 A * | 10/2000 | Riggins | G06F 9/54 | 709/203 |
| 6,546,002 B1 * | 4/2003 | Kim | H04M 1/72525 | 370/351 |
| 6,700,972 B1 * | 3/2004 | McHugh | H04M 3/42102 | 379/207.15 |
| 7,266,595 B1 * | 9/2007 | Black | H04L 41/0806 | 709/223 |
| 7,356,307 B1 * | 4/2008 | Parker | H04M 3/42263 | 370/352 |
| 7,602,894 B1 * | 10/2009 | Shaffer | H04M 3/42042 | 379/207.13 |
| 7,929,955 B1 * | 4/2011 | Bonner | H04M 3/42068 | 455/414.1 |
| 8,126,960 B2 * | 2/2012 | Obradovich | H04L 29/12122 | 709/203 |
| 8,458,356 B2 * | 6/2013 | Weel | H04L 67/10 | 709/217 |
| 9,715,707 B2 * | 7/2017 | Naqvi | G06Q 30/0631 | |
| 2002/0013815 A1 * | 1/2002 | Obradovich | H04L 29/12122 | 709/204 |
| 2002/0135613 A1 * | 9/2002 | O'Hara | G06F 9/4451 | 715/745 |
| 2002/0137517 A1 * | 9/2002 | Williams | H04B 7/2606 | 455/444 |
| 2003/0147369 A1 * | 8/2003 | Singh | H04L 1/0007 | 370/338 |
| 2003/0167167 A1 * | 9/2003 | Gong | G06F 3/16 | 704/250 |
| 2004/0015998 A1 | 1/2004 | Bokor et al. | | |
| 2004/0037403 A1 * | 2/2004 | Koch | H04M 1/56 | 379/142.16 |
| 2004/0043753 A1 | 3/2004 | Wake et al. | | |
| 2004/0128389 A1 * | 7/2004 | Kopchik | G06F 21/34 | 709/228 |
| 2004/0190698 A1 * | 9/2004 | Kowalski | H04M 3/42042 | 379/142.06 |
| 2004/0226034 A1 | 11/2004 | Kaczowka et al. | | |
| 2005/0026568 A1 | 2/2005 | Hawker et al. | | |
| 2005/0073999 A1 * | 4/2005 | Koch | H04L 12/1859 | 370/352 |
| 2005/0108297 A1 * | 5/2005 | Rollin | G06F 17/30174 | |
| 2005/0177614 A1 * | 8/2005 | Bourne | H04L 51/32 | 709/200 |
| 2006/0072726 A1 * | 4/2006 | Klein | H04M 3/42153 | 379/201.01 |
| 2006/0224675 A1 * | 10/2006 | Fox | G06Q 10/00 | 709/206 |
| 2007/0157241 A1 | 7/2007 | Walker | | |
| 2007/0300185 A1 * | 12/2007 | Macbeth | G06F 9/4443 | 715/825 |
| 2008/0005238 A1 * | 1/2008 | Hall | G06Q 10/10 | 709/204 |
| 2009/0094350 A1 | 4/2009 | Rive et al. | | |
| 2011/0258303 A1 * | 10/2011 | Nath | G06F 9/468 | 709/223 |
| 2012/0173339 A1 * | 7/2012 | Flynt | G06F 3/0481 | 705/14.58 |
| 2012/0226749 A1 * | 9/2012 | Dale | G06Q 50/01 | 709/204 |

OTHER PUBLICATIONS

U.S. Office Action dated Mar. 30, 2011 in U.S. Appl. No. 11/555,536.
U.S. Notice of Allowance dated Oct. 3, 2011 in U.S. Appl. No. 11/555,536.
U.S. Notice of Allowance dated Oct. 26, 2011 in U.S. Appl. No. 11/555,536.
U.S. Notice of Allowance dated Nov. 14, 2011 in U.S. Appl. No. 11/555,536.
U.S. Office Action dated Mar. 20, 2014 in U.S. Appl. No. 13/307,713.
U.S. Office Action dated Aug. 19, 2014 in U.S. Appl. No. 13/307,713.
U.S. Notice of Allowance dated Apr. 27, 2015 in U.S. Appl. No. 13/307,713.

* cited by examiner

LIFE CYCLE MANAGEMENT OF USER-SELECTED APPLICATIONS ON WIRELESS COMMUNICATIONS DEVICES

CROSS REFERENCE TO RELATED APPLICATIONS

This application is a continuation of U.S. application Ser. No. 13/307,713, filed Nov. 30, 2011, now U.S. Pat. No. 9,124,691, which is a continuation of U.S. application Ser. No. 11/555,536, filed Nov. 1, 2006, now U.S. Pat. No. 8,126,128, the entireties of which are herein incorporated by reference.

BACKGROUND

As wireless communications devices become more powerful and sophisticated, an increasing number of applications are becoming available for these devices. Additionally, different makes and models of such devices continue to proliferate. As the market for such devices expands, different types of customers may consider purchasing and using these devices, and installing different applications on those devices.

Typically, the customers manually install the applications onto the devices, and thereafter maintain the applications manually, including un-installing applications. In some cases, installing and managing these applications may be a challenge, particularly for inexperienced or casual customers. For example, it may be difficult for a customer to determine whether his or her device meets the minimum configuration specified for a given application of interest. Once the application is installed, customers may not be aware of subsequent updates, bug fixes, or upgrades available for the application, unless the customers proactively search for these items.

SUMMARY

Tools and techniques for performing life cycle management of user-selected applications on wireless communications devices are described herein. In part, the tools provide machine-readable media for presenting to the subscriber a list of available applications for installation on the device, and for receiving selections from the subscriber of one or more of the applications. The tools provide a mechanism for removing applications from the device. Additionally, the tools provide methods for selling advertising space on the devices.

BRIEF DESCRIPTIONS OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
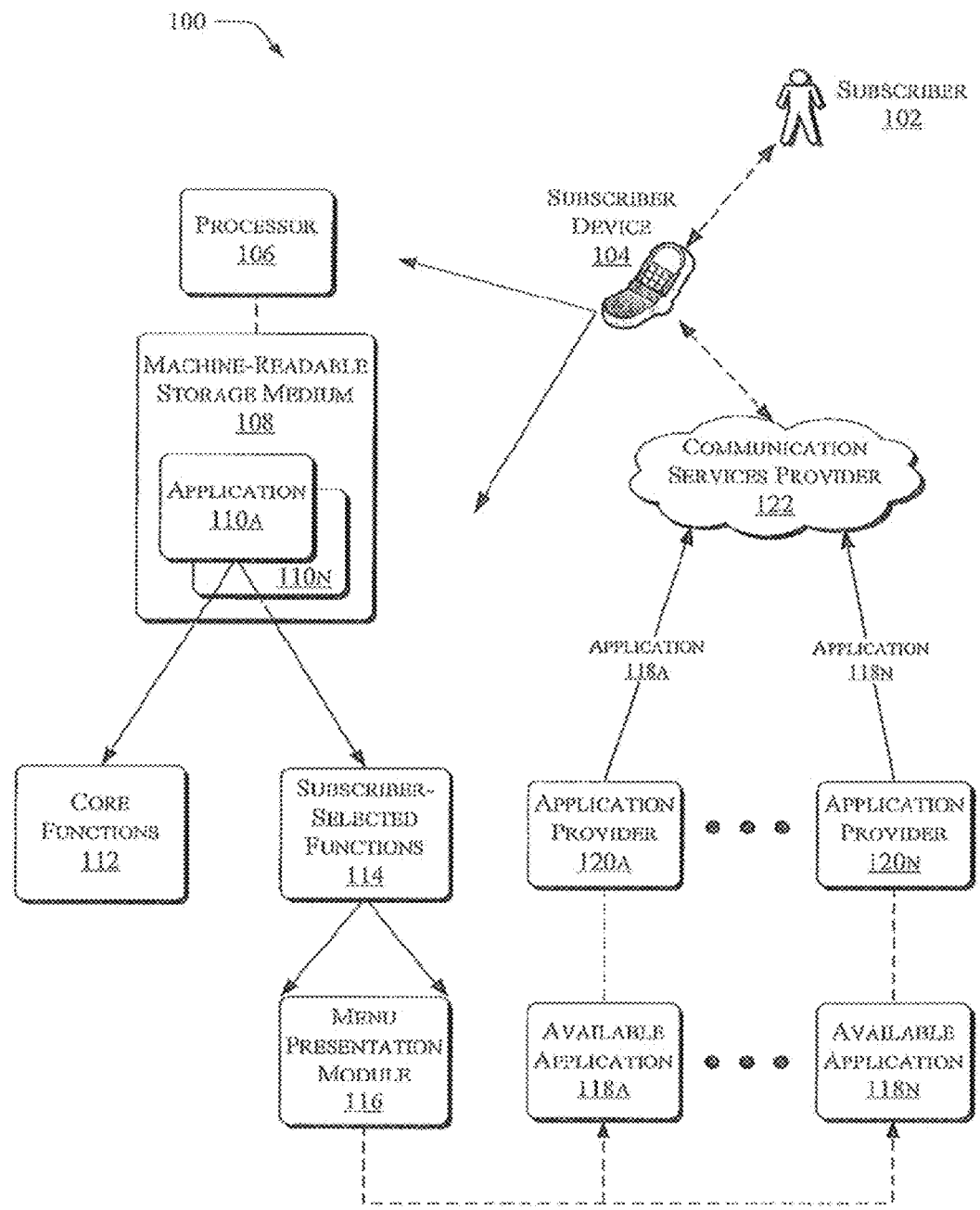
FIG. 1 is a block diagram of an overall environment for performing life cycle management of user-selected applications on wireless communications devices.

FIG. 1 illustrates an overall environment 100 for performing life cycle management of user-selected applications on wireless communications devices. A customer or user, illustrated in FIG. 1 as a "subscriber" 102 may use a communication device, illustrated in FIG. 1 as a "subscriber device" 104, and may obtain services related thereto. It should be appreciated that the term "subscriber" includes not only a user with a subscription to a communication service for a communication device but also an authorized user of the communication service for the communication device. Moreover, although one subscriber and one subscriber device are shown in FIG. 1 for simplicity of illustration, it should be appreciated that any number of subscribers and subscriber devices may be used.

The device 104 may include one or more processors 106 that communicate with one or more instances of machine-readable or computer-readable storage media 108. The media 108 may store software that may be loaded into the processor 106 and executed, thereby causing the device 104 to perform the various functions described herein. More specifically, the media 108 may store one or more applications 110. FIG. 1 shows two applications 110A and 110N for convenience only, but the media 108 may contain any number of applications.

The applications 110 may be characterized as core functions, represented generally at block 112, or as subscriber-selected functions, represented generally at block 114. Generally, the core functions 112 may be installed on the device 104 as a minimum configuration, and may include applications related to authenticating subscribers, registering the devices on communications networks, handing over the devices from one cell or network to another, providing voice communications and voice mail services, or the like.

The subscriber-selected functions 114 may provide extra features additional to the core functions 112. The subscriber 102 may select one or more of these functions for installation on the device 104, either at the time of purchasing the device 104 or some time afterwards. Examples of the subscriber-selected functions 114 may include applications related to e-mailing, voice over IP (VoIP) functions, instant messaging (IMing), chat clients, location, video on demand, multi-player gaming or the like.

The media 108 may include a menu presentation module 116 that assembles a menu containing one or more available applications 118 for selection and installation on the device 104. The menu presentation module 116 may present the menu to the subscriber using the device 104. The available applications 118 may correspond to the subscriber-selected functions 114. By selecting one or more of the available applications 118 presented on the menu, the subscriber may configure the device 104 to perform any of the subscriber-selected functions 114. FIG. 1 shows two available applications 118A and 118N for convenience of illustration only, but the environment 100 may include any number of available applications.

One or more application providers 120 may provide the available applications 118 to a communication services provider 122. In the course of obtaining rights to use the device 104 and accessing services related thereto, the subscriber 102 may interact or contract with the communication services provider 122. In turn, the communication services provider 122 may have relationships with one or more of the application providers 120. The application providers 120 may be related or unrelated to the communication services provider 122. For example, one or more of the application providers 120 may be third-party software vendors, relative to the communication services provider 122.

The device 104 may be responsive to subscriber input, selecting one or more of the available applications 118, for installation. In this manner, the environment 100 enables the subscriber 102 to customize the device 104 with applications 118 suited to his or her particular purposes.

The applications 118 may include standalone client applications that reside and execute only on the device 104, or may include client applications that interact with one or more server applications on the communication services provider 122. Additionally, the client applications 118 may interact with one or more server applications provided by third parties, with these server applications accessible through a network associated with the communication services provider 122.

Figure 2:
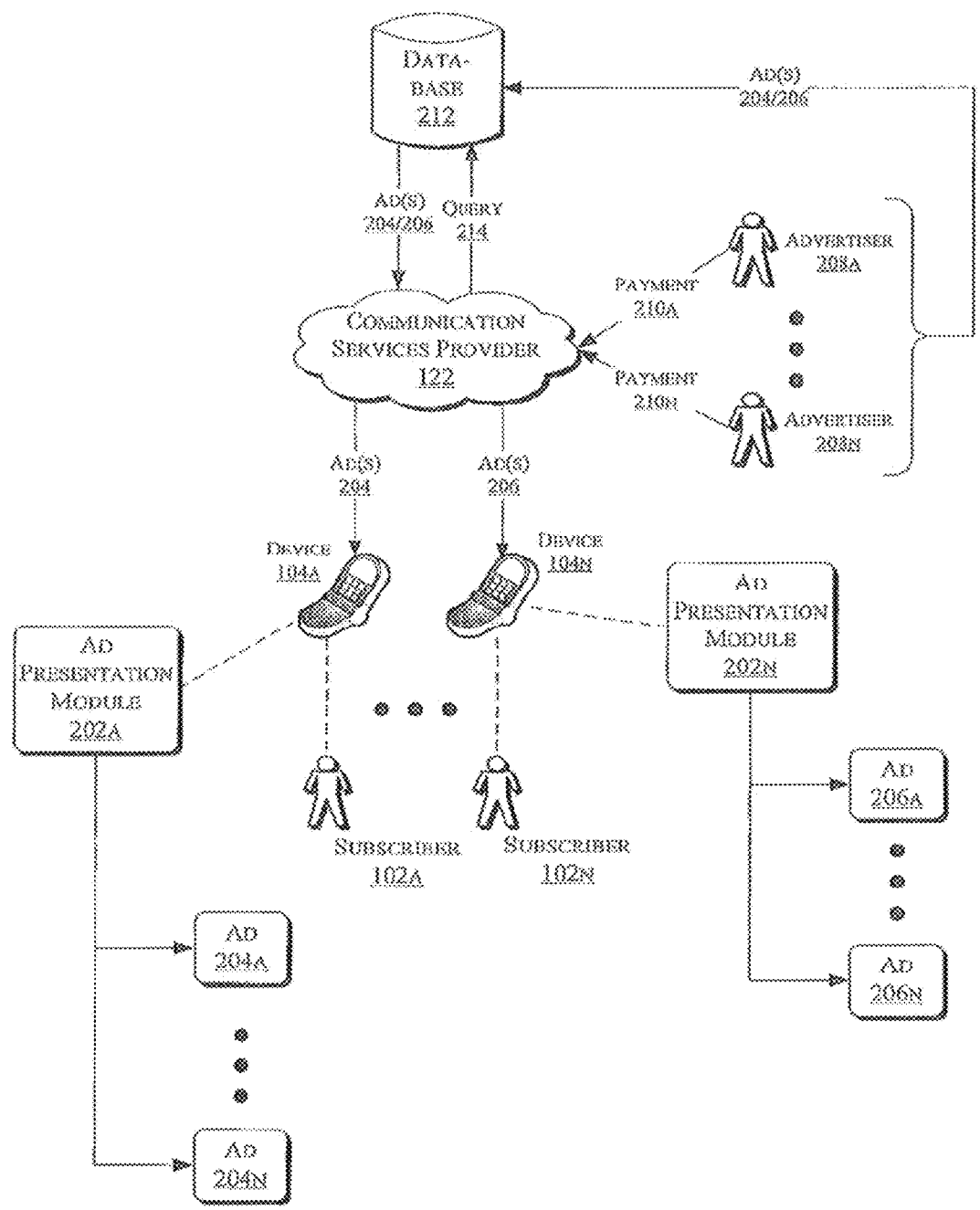
FIG. 2 is a combined block and flow diagram of methods related to selling advertising space on the wireless communications devices.

Having described the environment 100 with FIG. 1, the discussion now turns to a description of methods related to selling advertising space on the wireless communications devices, now presented with FIG. 2.

FIG. 2 illustrates components and flows related to methods for selling advertising space on the wireless communications devices. As described above in FIG. 1, the subscribers 102A and 102N may obtain corresponding devices 104A and 104N from the communication services provider 122. The devices 104A and 104N may include respective advertisement presentation modules 202A and 202N (collectively, advertisement presentation modules 202). These advertisement presentation modules 202 may be similar to the menu presentation module 116 shown in FIG. 1. However, the advertisement presentation module 202A may present one or more advertisements 204A and 204N (collectively, advertisements 204) to the subscriber 102A via the device 104A, and the advertisement presentation module 202N may present one or more advertisements 206A and 206N (collectively, advertisements 206) to the subscriber 102N via the device 104N.

One or more advertisers 208 may provide the advertisements 204 and 206, through the communication services provider 122. FIG. 2 shows two advertisers 208A and 208N for convenience only, but any number of advertisers could be included. In exchange for placing their advertisements before the subscribers 102 via the devices 104, the advertisers 208 may provide respective payments 210A and 210N to the communication services provider 122.

In addition, the communication services provider 122 may intelligently select advertisements to be presented to the subscribers by querying a database 212. For example, the database 212 may store information reflecting past transactions conducted between the communication services provider 122 and the subscribers 102. The database 212 may store demographic profiles of the subscribers 102. In other instances, the database 212 may store information pertaining to relationships with third parties. For example, the communication services provider 122 and such third parties may enter into branding or marketing arrangements, so that the customers of the third parties may subscribe to the services offered by the communication services provider 122 on some set of terms.

In any event, the communication services provider 122 may query the database 212 with some identifier associated with a given subscriber 102, denoted generally as query 214. In response to the query 214, the database 212 may return one or more ads 204, 206 that are selected specifically for the subscriber 102, based on, for example, preferences or past history associated with the subscriber 102. These ads 204, 206 may be provisioned onto the device 104, so that when the subscriber 102 first powers-on the device 104, or at any time afterwards, the ads 204, 206 are presented on the device 104.

Figure 3:
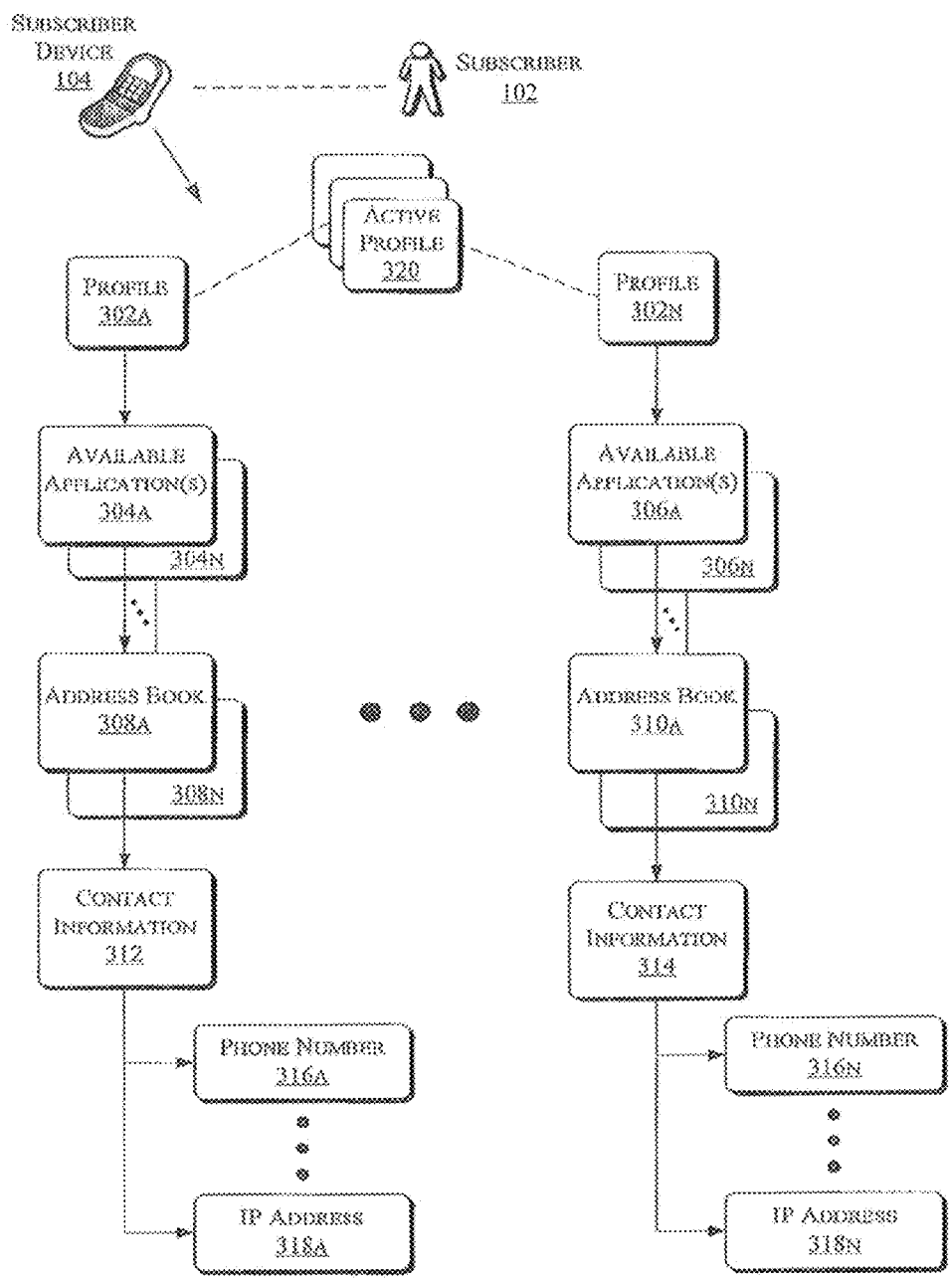
FIG. 3 is a block diagram of a plurality of different profiles that may be supported by the wireless communications devices.

Having described the components and data flows in FIG. 2, the discussion now turns to a description a plurality of different profiles that may be supported by the subscriber devices 104, now presented with FIG. 3.

FIG. 3 illustrates a plurality of different profiles 302 that may be supported by the subscriber devices 104. For example only, but not limitation, FIG. 3 shows an example subscriber device 104 associated with two profiles 302A and 302N, but single instances of the subscriber devices could support any number of different profiles. For example, a subscriber could configure his or her device with a profile for work-related use, and a profile for personal use. In other examples, the subscriber may define profiles pertaining to volunteer work, charitable activities, board-of-directors positions, or the like.

The various profiles 302 may be associated with one or more applications 304 and 306 that are available under the different profiles 302. For example, a subscriber 102 may use an enterprise e-mail application provided by his or her employer for work purposes, but may use a more basic e-mail application for personal correspondence. In any event, FIG. 3 shows the profile 302A as associated with any number of applications 304A and 304N. and the profile 302N as associated with any number of applications 306A and 306N.

The applications 304 and 306 may be associated with respective address books or other forms of contact lists, denoted generally at 308 and 310. More specifically, FIG. 3 shows the application 304A associated with an address book 308A, and the application 304N associated with an address book 308N. FIG. 3 also shows the application 306A associated with an address book 310A, and the application 306N associated with an address book 310N.

The various address books 308 and/or 310 may include various instances of contact information 312 and/or 314. This contact information 312, 314 may generally take any form suitable for addressing voice or data communications to a person, or for receiving such communications from a person. For example, the contact information 312, 314 may include phone numbers (e.g., 316A and 316N, collectively 316), addresses (e.g., 318A and 318N, collectively 318), or the like. The addresses 318 may take the form of network addresses, IP addresses, e-mail addresses, street address, Global Positioning Satellite coordinates or any other convenient form.

At any given time, the subscriber 102 may make one or more of the profiles 302 active, as denoted by blocks 320. When different ones of the profiles are active, the applications and address books corresponding to the active profiles 320 are available for execution. For example, if the subscriber 102 has defined a profile 302 for work-related purposes, the subscriber 102 may have that work-related profile active whenever the subscriber is "on call" to respond to work-related matters.

Figure 4:
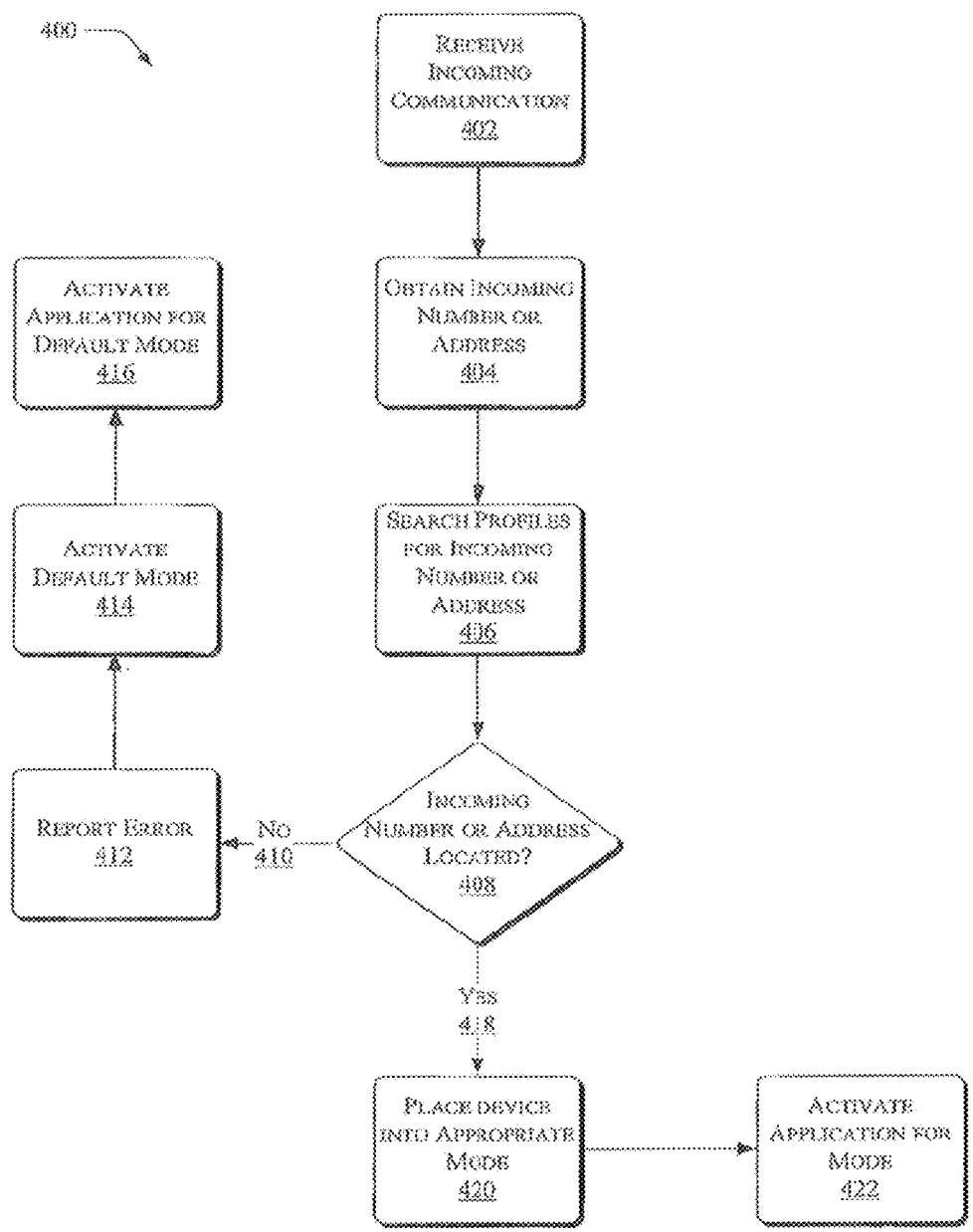
FIG. 4 is a flow diagram of a process performed when the wireless communications devices receive terminating or incoming communications.
Figure 5:
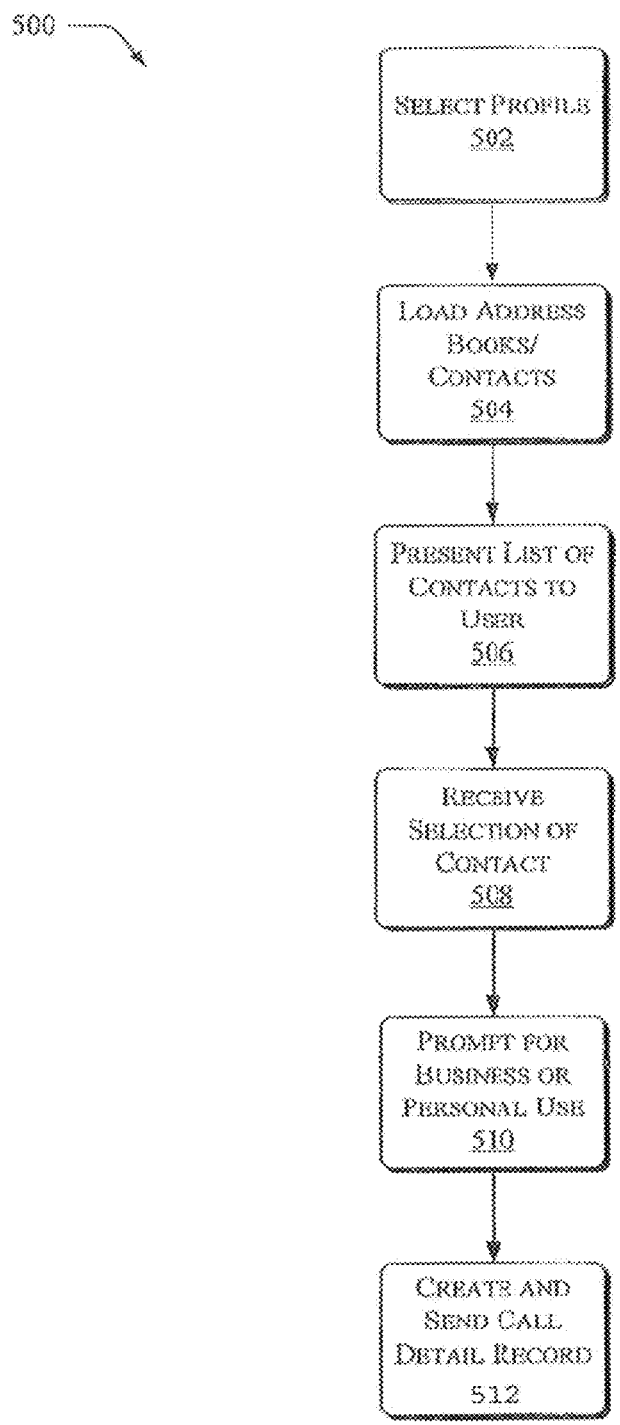
FIG. 5 is a flow diagram of a process performed when the wireless communications devices initiate outgoing communications.

Having described the profiles in connection with FIG. 3, the discussion now turns to a description of how these profiles may be used to handle incoming or outgoing communications, now presented with FIGS. 4 and 5.

FIG. 4 illustrates a process 400 that may be performed when the subscriber devices (e.g., 104) receive terminating or incoming communications. While the process 400 is described in connection with certain components illustrated herein, it is noted that some or all of the process 400 may be performed with other components without departing from the scope of the description herein.

Block 402 represents receiving the incoming communication at the subscriber devices. These communications may take the form of incoming voice calls arriving via one or more circuit-switched or packet-switched communications network, or may be data communications (e.g., audio or video streams, e-mails, or the like).

Block 404 represents obtaining a telephone number, network address (as might be used in VoIP communications), or other similar identifier, indicating where the incoming communication is directed. For example, if an incoming voice call is directed to (555) 555-1212, then block 404 may include obtaining this dialed number. Block 404 may thus include using the Dialed Number Information Service (DNIS) or other equivalents.

Block 406 represents searching one or more profiles associated with the device that receives the incoming communication. FIG. 3 shows examples of the profiles at 302. More specifically, block 406 may include searching contact information records (e.g., 312 and/or 314) for any contact that matches the incoming identifier obtained in block 404.

Decision block 408 may include evaluating whether the incoming identifier was located in any of the profiles. If not, the process 400 takes No branch 410 to block 412. In block 412, the process 400 may report this condition to the subscriber, and prompt the subscriber for instructions. In some instances, the process 400 may activate a default mode for the device, as represented generally in block 414. In block 416, the process 400 may start an application associated with this default mode. In these instances, the process 400 may omit the notification shown in block 412, but may instead perform block 414 and/or block 416 without providing the notification.

From block 408, if the incoming identifier was located in one of the profiles, then the process 400 takes Yes branch 418 to block 420. Block 420 represents placing the device into a mode corresponding to the profile in which the incoming identifier was located. For example, referring briefly to FIG. 3, assume that the incoming identifier of the phone number (555) 555-1212 was located under the profile 302A. In this scenario, block 420 may include placing the device into its business or professional mode.

Block 422 represents activating one or more applications in response to locating the incoming identifier in blocks 406 and 408. For example, assume that the profile 302A is associated with a business or professional mode, and, as such, is associated with one or more enterprise-type applications 304. Block 422 may include activating these applications so that the subscriber may readily use them to respond or process the incoming communication.

FIG. 5 illustrates a process 500 that may be performed when the wireless communications devices initiate outgoing communications. While the process 500 is described in connection with certain components illustrated herein, it is noted that some or all of the process 500 may be performed with other components without departing from the scope of the description herein.

Block 502 represents enabling the subscriber to configure the device into one of a plurality of different operating modes (e.g., business, personal, or the like) and select an application with which to initiate the outgoing communication, using a device such as the device 104. Block 502 may include enabling the user to select a profile in which the device is to operate. Examples of profiles are shown in FIG. 3 at 320.

Block 504 represents loading any address books, contact lists, or similar structures for presentation to the subscriber. Block 504 may include loading the entries in the address book into a menu structure for review and selection by the subscriber.

Block 506 represents presenting the list of contacts to the subscriber. The contacts may be associated with one or more instances of contact information (e.g., telephone numbers, network or IP addresses, e-mail addresses, chat or IM names, or the like). Block 506 may include presenting these instances of contact information.

Block 508 represents receiving a selection of one of the contacts, as a destination or target of the outgoing communication. In instances where a given contact is associated with more than one instance of contact information, block 508 may include enabling the subscriber to select the contact information to use for the outgoing communication. Block 510 represents a prompt for business use or personal use.

Finally, block 512 represents creating and sending a call detail record relating to the outgoing communication.

Figure 6:
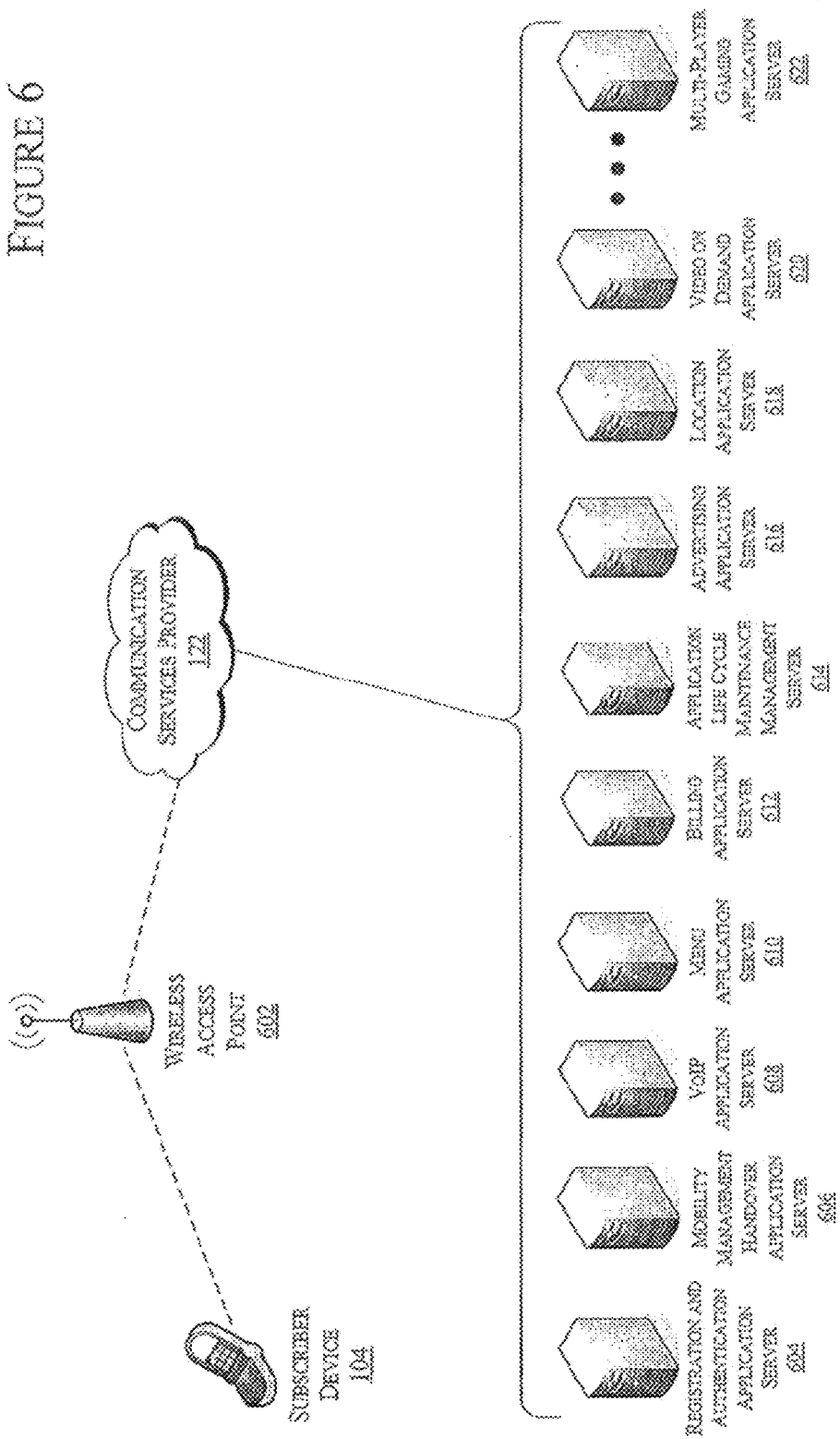
FIG. 6 is a block diagram of illustrative components of a communications service provider, suitable for supporting life cycle management of user-selected applications on wireless communications devices.

Having described the process flows with FIGS. 4 and 5, the discussion now turns to a description of illustrative servers that may be included in the communication services provider, now presented with FIG. 6.

FIG. 6 illustrates example components of the communication services provider 122, suitable for supporting life cycle management of user-selected applications on wireless communications devices. The device 104 may communicate with the communication services provider 122 through a wireless access point 602, which generally functions to provide a gateway into a broadband communications network. For example, the wireless access point 602 may be implemented as a wireless router that is compliant with WiFi (i.e., IEEE 802.11) or WIMAX (i.e., IEEE 802.16) specifications to operate within unlicensed communication frequencies. Additionally, other implementations of the wireless access point 602 may operate within licensed communication spectrum with a variety of broadband wireless IP protocols (e.g., WiMax, UMTS/HSDPA, CDMA EVDO, EDGE, and the like).

The communication services provider 122 may include one or more application servers, as shown in FIG. 6. The configuration shown in FIG. 6 is chosen for convenience only, but not to limit possible implementations of the communication services provider 122. More specifically, the various servers are shown only for ease of reference in describing different illustrative functions, and these functions could be combined or redistributed among different servers without departing from the scope and spirit of the description herein.

Turning to the servers in more detail, some of the servers may be related to core functions, such as those represented in FIG. 1 at block 112. For example, a registration and authentication application server 604 may handle core functions such as registering and authenticating the device 104 onto communication networks. A mobility management handover application server 606 may administer the handing over of the devices 104 from one cell to another as the devices move geographically. A VoIP application server 608 may store and distribute voice or data packets related to ongoing conversations, in implementations using the Voice of IP protocol. A menu application server 610 may control the display and choices of applications that are available to the subscriber to download. A billing application server 612 maintains billing and call detail records relating to the various subscribers 102. As the subscribers 102 originate outgoing communications and/or receive incoming communications, the billing application server 612 updates call detail records accordingly.

An application life cycle maintenance management server 614 administers subscriber-selected functions, such as those represented in FIG. 1 at block 114. Generally, the application life cycle maintenance management server 614 enables the subscribers 102 to configure their devices 104 as most appropriate for their intended uses, enabling the subscribers 102 to download and install particular applications. Further details relating to functions performed by the application life cycle maintenance management server 614 are now provided with FIG. 7.

An advertising application server 616 may store the advertisements that are presented to the subscribers 102 via the devices 104. Examples of advertisements are shown in FIG. 2 at 204 and 206. FIG. 2 also shows example advertisement presentation modules at 202. The advertising application server 616 may, for example, push advertising content to the advertisement presentation modules 202 on the devices 104.

A location application server 618 may store and track the locations of various subscriber devices 104. In this manner, the location application server 618 may enable the communication services provider 122 to monitor the locations of the devices 104 at any particular time.

A video on demand application server 620 may store video content that may be streamed on demand to the subscriber device 104. Thus, the video on demand application server 620 may enable subscribers to access video content via the device 104.

A multi-player gaming application server 622 may store gaming content, and enable subscribers to access the gaming content via the devices 104. In some instances, the multi-player gaming application server 622 may enable two or more of the subscribers 102 to play games with one another, whether in adversarial or collaborative roles. In other instances, the multi-player gaming application server 622 may enable single subscribers to access the gaming content on a more solitary basis.

Figure 7:
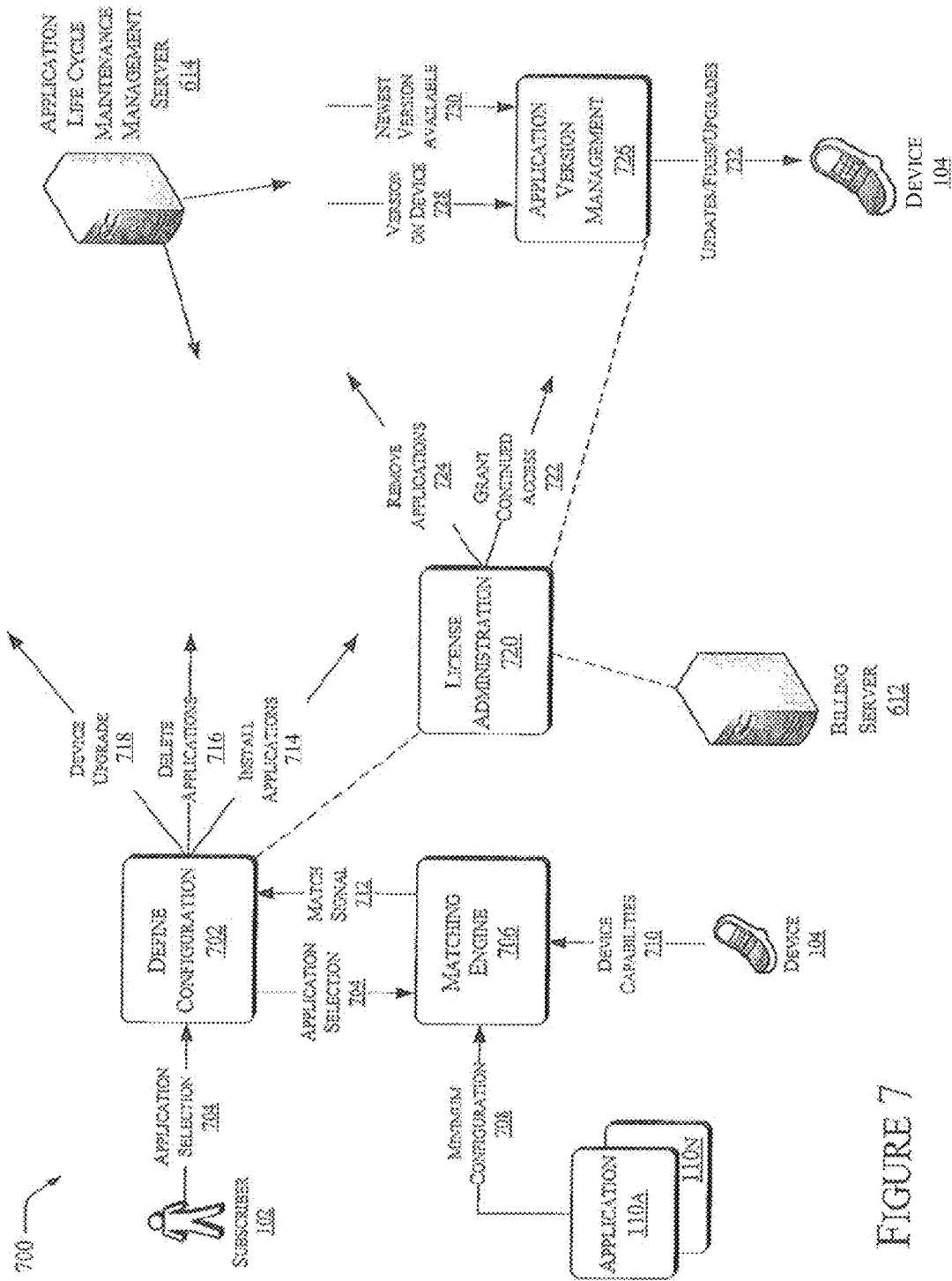
FIG. 7 is a block diagram of illustrative functions that may be performed by an application life cycle maintenance management server, as shown in FIG. 6.

FIG. 7 illustrates several examples of functions that may be performed by the application life cycle maintenance management server 614, as shown in FIG. 6. As represented generally in block 702, the application life cycle maintenance management server 614 may manage how the devices 104 are configured, for example, when the subscribers first obtain the devices 104 or at any time afterwards. More specifically, the configuration management block 702 may receive data representing a selection 704 made by a subscriber (e.g., the subscriber 102) of one or more applications (e.g., the applications 110A and 110N) for installation on the device 104.

The configuration management block 702 may pass the application selection 704 through to a matching engine 706, which determines whether the selected application may be installed on the device 104. The matching engine 706 may receive data representing minimum configuration parameters 708 for different respective applications 110. The matching engine 706 may also receive data representing capabilities 710 of particular devices, such as the amount of available storage. It is assumed that the device 104 as shown in FIG. 7 is associated with the subscriber 102, such that the subscriber 102 has requested to install an application 110 onto the device 104.

The matching engine 706 may compare the configuration parameters 708 for a given application 110 to the capabilities 710 of a given device 104, to determine whether the application 110 may be installed on the device 104. Examples of these device capabilities 710 may include memory capacity, processor speed, display capabilities, and the like. If the capabilities 710 of the given device 104 match or exceed the configuration parameters 708 for the given application 110, then the application 110 may be installed on the device 104. A match signal 712 may indicate whether the application 110 may be installed on the device 104, and may pass from the matching engine 706 to the configuration management block 702.

If the match signal 712 indicates that the application 110 may be installed on the device 104, the configuration management block 702 may so install the application 110, as represented at 714. However, if the match signal 712 indicates that the application 110 is not a match for the device 104 as currently configured, the configuration block 702 may recommend that the subscriber 102 delete one or more applications 110 currently installed on the device 104, as represented at 716. Additionally, the configuration block 702 may recommend that the subscriber 102 upgrade to a different device 104, as represented at 718. In this latter scenario, the configuration block 702 may provision the upgraded device with the applications 110 previously selected by the subscriber 102.

Once the device 104 is installed and configured with the selected applications 110, the application life cycle maintenance management server 614 may administer any licensing issues related to these applications 110 on an ongoing basis. Block 720 represents this license administration function. Typically, the subscriber 102, when installing applications 110 onto the device 104, does not obtain ownership rights in the applications 110, but instead obtains a license to use the application 110. These license rights may be subject to the subscriber 102 paying license fees and/or performing other obligations. These payments and other obligations may be tracked by the billing server 612, shown in FIG. 6 and carried forward to FIG. 7 for convenience.

If the subscriber 102 remains current on any license payments related to a given application 110, and performs any other obligations, then the license administration block 720 grants the subscriber 102 continued access to the given application 110, as represented at 722. However, if the subscriber 102 is not current on the license payments related to a given application 110, or fails to perform any other obligations, then the license administration block 720 may send a notification to the subscriber 102, detailing what the subscriber 102 may do to become current and maintain access to the applications 110. If the subscriber 102 does not become current, the license administration block 720 may remove or disable the given application 110 on the subscriber's device, as represented at 724.

The application life cycle maintenance management server 614 may also manage the client applications installed on the devices 104, as subsequent versions of those applications 110 become available. For example, vendors providing those applications 110 (e.g., the application providers 120 in FIG. 1) may introduce new features, fix bugs present in earlier versions, or the like. In any event, an application version management block 726 may receive data 728 representing versions of one or more applications 110 currently installed on the device 104. The version management block 726 may also receive data 730 representing the newest versions of those applications 110. If the newest versions of the applications 110 are not installed on the device 104, then the version management block 726 may push updated versions of the applications 110 to the device 104. These updated versions are represented in FIG. 7 at 732. The updated versions 732 may be pushed to the devices 104 when the devices 104 are in communication with the communication services provider 122 and the application life cycle maintenance management server 614.

Having provided the above description, several observations are now noted. The tools and techniques described above for performing life cycle management of user-selected applications on wireless communications devices enable use of a client-services model for maintaining the applications 110 on the devices 104, with the communication services provider 122 (and related components) assuming a server role, and the various devices 104 assuming a client role. Additionally, the communication services provider 122 and the application life cycle maintenance management server 614 may provide a network-based, automated platform for configuring and managing applications installed on a variety of subscriber devices 104, thereby relieving the subscribers 102 from these tasks.

It is noted that the various modules and servers shown in the Figures herein may be implemented in hardware, software, or any combination thereof. Additionally, these modules and servers are shown as separate items only for convenience of reference and description, and these representations do not limit possible implementations of the teachings herein. Instead, various functions described with these modules and servers could be combined or separated as appropriate in a given implementation, without departing from the scope and spirit of the description herein.

What is claimed:

1. A method comprising:
    receiving, by a mobile device, an incoming communication directed to the mobile device, wherein the mobile device stores a first profile and a second profile, wherein a first application stored on the mobile device corresponds to the first profile and a second application stored on the mobile device corresponds to the second profile, and wherein the first application is associated with a first contact list comprising first contact information and the second application is associated with a second contact list comprising second contact information;
    obtaining, by the mobile device, an identifier from the incoming communication, wherein the identifier indicates that the incoming communication is directed to the mobile device;
    searching, by the mobile device, for contact information in the first contact information of the first contact list or the second contact information of the second contact list that matches the identifier obtained from the incoming communication;
    in response to locating the contact information that matches the identifier obtained from the incoming communication in the first contact information of the first contact list instead of in the second contact information of the second contact list,
        activating, by the mobile device, the first profile,
        placing, by the mobile device, the mobile device in a first operating mode corresponding to the first profile, wherein the first operating mode corresponding to the first profile comprises a business operating mode, wherein a second operating mode corresponds to the second profile, and wherein the second operating mode corresponding to the second profile comprises a personal operating mode, and
        activating, by the mobile device, the first application corresponding to the first profile to allow use of the first application for processing the incoming communication, wherein the first application corresponds to the business operating mode; and
    in response to locating the contact information that matches the identifier obtained from the incoming communication in the second contact information of the second contact list instead of in the first contact information of the first contact list,
        activating, by the mobile device, the second profile,
        placing, by the mobile device, the mobile device in the second operating mode corresponding to the second profile, and
        activating, by the mobile device, the second application corresponding to the second profile to allow use of the second application for processing the incoming communication.

2. The method of claim 1, wherein activating the second profile provides that the second application is available to process the incoming communication.

3. The method of claim 1, wherein activating the first profile provides that the first application is available for execution.

4. The method of claim 1, wherein the first application is an enterprise-type application.

5. The method of claim 1, wherein the incoming communication is a voice call or a data communication.

6. The method of claim 1, wherein the identifier obtained from the incoming communication comprises at least one of a phone number, a network address, an electronic mail address, an internet protocol address, a street address, or a global positioning satellite coordinate.

7. The method of claim 1, further comprising in response to failing to locate the contact information that matches the identifier obtained from the incoming communication in either the first contact information or the second contact information, providing a prompt to a user of the mobile device for instructions on how to proceed.

8. The method of claim 1, further comprising in response to failing to locate the contact information that matches the identifier obtained from the incoming communication in either the first contact information or the second contact information,
    placing, by the mobile device, the mobile device in a default operating mode; and
    activating, by the mobile device, an application associated with the default operating mode to allow use of the application for processing the incoming communication.

9. The method of claim 1, wherein at least one of the first application or the second application is related to authenticating subscribers, registering the mobile device on communications networks, handing over the mobile device from one cell or network to another, providing voice communications, or providing voice mail services.

10. The method of claim 1, wherein at least one of the first application or the second application is related to e-mailing, voice over IP functions, instant messaging, chat clients, location, video on demand, or multi-player gaming.

11. A mobile device comprising:
a processor; and
a memory that stores instructions that, when executed by the processor, cause the processor to perform operations comprising
receiving an incoming communication directed to the mobile device, wherein the mobile device stores a first profile and a second profile, wherein a first application stored on the mobile device corresponds to the first profile and a second application stored on the mobile device corresponds to the second profile, and wherein the first application is associated with a first contact list comprising first contact information and the second application is associated with a second contact list comprising second contact information,
obtaining an identifier from the incoming communication, wherein the identifier indicates that the incoming communication is directed to the mobile device,
searching for contact information in the first contact information of the first contact list or the second contact information of the second contact list that matches the identifier obtained from the incoming communication,
in response to locating the contact information that matches the identifier obtained from the incoming communication in the first contact information of the first contact list instead of in the second contact information of the second contact list,
activating the first profile,
placing the mobile device in a first operating mode corresponding to the first profile, wherein the first operating mode corresponding to the first profile comprises a business operating mode, wherein a second operating mode corresponds to the second profile, and wherein the second operating mode corresponding to the second profile comprises a personal operating mode, and
activating the first application corresponding to the first profile to allow use of the first application for processing the incoming communication, wherein the first application corresponds to the business operating mode, and
in response to locating the contact information that matches the identifier obtained from the incoming communication in the second contact information of the second contact list instead of in the first contact information of the first contact list,
activating the second profile,
placing the mobile device in the second operating mode corresponding to the second profile, and
activating the second application corresponding to the second profile to allow use of the second application for processing the incoming communication.

12. The mobile device of claim 11, wherein the operations further comprise in response to failing to locate the contact information that matches the identifier obtained from the incoming communication in either the first contact information or the second contact information, providing a prompt to a user of the mobile device for instructions on how to proceed.

13. The mobile device of claim 11, wherein the operations further comprise in response to failing to locate the contact information that matches the identifier obtained from the incoming communication in either the first contact information or the second contact information,
placing the mobile device in a default operating mode; and
activating an application associated with the default operating mode to allow use of the application for processing the incoming communication.

14. A non-transitory computer-readable storage medium storing instructions that, when executed by a processor of a mobile device, cause the processor to perform operations comprising:
receiving an incoming communication directed to the mobile device, wherein the mobile device stores a first profile and a second profile, wherein a first application stored on the mobile device corresponds to the first profile and a second application stored on the mobile device corresponds to the second profile, and wherein the first application is associated with a first contact list comprising first contact information and the second application is associated with a second contact list comprising second contact information;
obtaining an identifier from the incoming communication, wherein the identifier indicates that the incoming communication is directed to the mobile device;
searching for contact information in the first contact information of the first contact list or the second contact information of the second contact list that matches the identifier obtained from the incoming communication;
in response to locating the contact information that matches the identifier obtained from the incoming communication in the first contact information of the first contact list instead of in the second contact information of the second contact list,
activating the first profile,
placing the mobile device in a first operating mode corresponding to the first profile, wherein the first operating mode corresponding to the first profile comprises a business operating mode, wherein a second operating mode corresponds to the second profile; and wherein the second operating mode corresponding to the second profile comprises a personal operating mode, and
activating the first application corresponding to the first profile to allow use of the first application for processing the incoming communication, wherein the first application corresponds to the business operating mode; and
in response to locating the contact information that matches the identifier obtained from the incoming communication in the second contact information of the second contact list instead of in the first contact information of the first contact list,
activating the second profile,
placing the mobile device in the second operating mode corresponding to the second profile, and
activating the second application corresponding to the second profile to allow use of the second application for processing the incoming communication.

15. The non-transitory computer-readable storage medium of claim 14, wherein the operations further comprise in response to failing to locate the contact information that matches the identifier obtained from the incoming communication in either the first contact information or the second contact information, providing a prompt to a user of the mobile device for instructions on how to proceed.

16. The non-transitory computer-readable storage medium of claim 14, wherein the operations further comprise in response to failing to locate the contact information that matches the identifier obtained from the incoming communication in either the first contact information or the second contact information, placing the mobile device in a default operating mode; and activating an application associated with the default operating mode to allow use of the application for processing the incoming communication.

17. The non-transitory computer-readable storage medium of claim 14, wherein the first application is an enterprise-type application.

\* \* \* \* \*